Oct. 31, 1939.  J. S. KIMBLE ET AL  2,177,660
METHOD AND APPARATUS FOR MAKING IMPROVED THERMOPLASTIC SHEETING
Filed Feb. 25, 1937   2 Sheets-Sheet 1
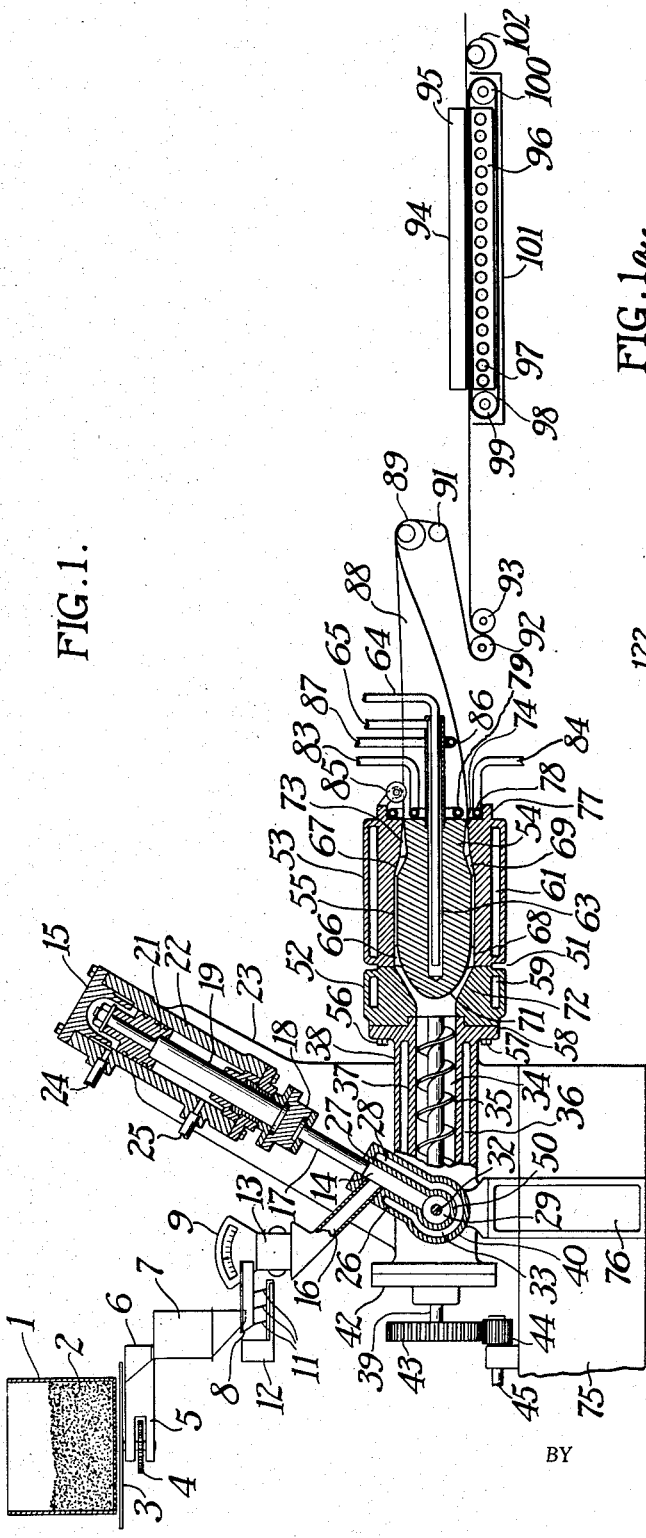
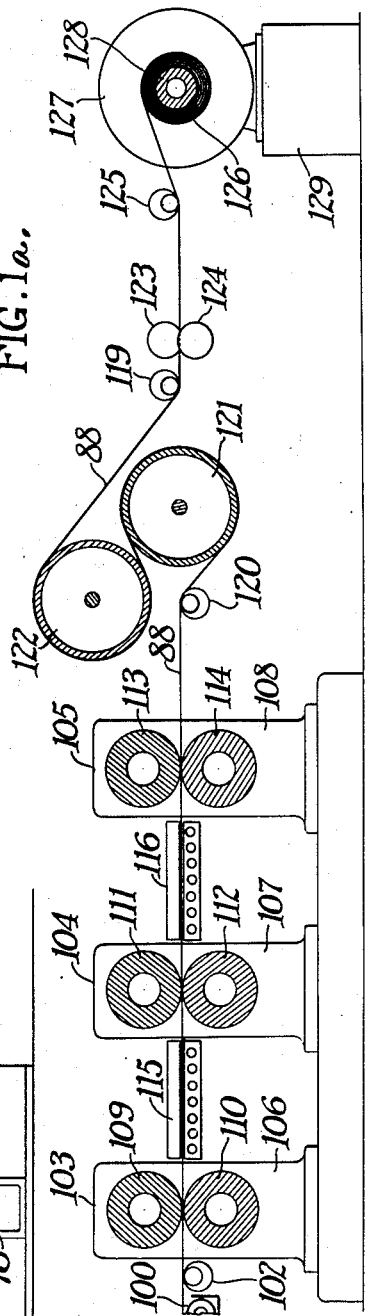
FIG.1.
FIG.1a.
John S. Kimble
Ernest C. Blackard
John S. McLellan
INVENTORS
BY
ATTORNEYS Oct. 31, 1939.  J. S. KIMBLE ET AL  2,177,660
METHOD AND APPARATUS FOR MAKING IMPROVED THERMOPLASTIC SHEETING
Filed Feb. 25, 1937  2 Sheets-Sheet 2

John S. Kimble
Ernest C. Blackard
John S. McLellan
INVENTORS

BY  N. M. Perrins
Daniel J. Mayne
ATTORNEYS

Patented Oct. 31, 1939

2,177,660

UNITED STATES PATENT OFFICE 2,177,660

METHOD AND APPARATUS FOR MAKING IMPROVED THERMOPLASTIC SHEETING

John S. Kimble, Ernest C. Blackard, and John S. McLellan, Kingsport, Tenn., assignors to Eastman Kodak Company, Rochester, N. Y., a corporation of New Jersey Application February 25, 1937, Serial No. 127,664

8 Claims. (Cl. 18—14)

This invention relates to processes and apparatus for the manufacture of sheeting from thermoplastic materials and more particularly to the manufacture of relatively thin transparent sheets from thermoplastic molding compounds such as cellulose acetate, cellulose acetate-propionate, ethyl and benzyl cellulose, and other organic derivatives of cellulose, and other suitable thermoplastic organic compounds for use in the manufacture of laminated glass.

Processes and apparatus for the manufacture of thin sheets and the use of such thin sheets is quite well known in the art. Such sheeting material is, to a large extent, produced and used for wrapping materials. In that instance the properties of such material need not necessarily be so exacting. However, in certain industrial uses such as, for example, in the manufacture of laminated glass, the exact specifications of the sheeting as regards both uniformity of composition and dimensions becomes of considerable importance. While sheets produced by conventional methods may appear to be substantially uniform, in many instances it can be found by careful inspection that the sheets are more or less non-uniform and have varying characteristics. That is, for example, conventionally produced sheeting may vary in thickness or different sections of sheeting may exhibit different strengths; or two similarly appearing sections of sheeting may have the same physical appearance but will exhibit markedly different shrinkage characteristics, owing to variations in the process of manufacture and to the presence of appreciable quantities of low boiling volatile solvents.

These variations, particularly shrinkage, are a source of considerable difficulty in the manufacture of laminated "safety" glass. A satisfactory method of making such laminated glass is to place a transparent sheet of thermoplastic material between two sheets of plate glass having a coating of adhesive on the sides toward the plastic sheet and to preliminarily press them together by suitable pressing apparatus. The final pressing is conducted in an autoclave at a high temperature and pressure. A suitable, usually black, moisture-proofing compound may then be placed around the edges of the lamination.

In such a process, it will be seen that there are periods of heating, the last being at a relatively high temperature and pressure. It is during these operations that the thermoplastic lamination tends to pull away from the glass and produce "blowins" which resemble elongated bubbles. Some of these "blowins" occur at the edges of the glass, making not only a stain from the heating fluid used in the autoclave, but causing an uneven and unattractive margin when the black moisture-proof sealing compound is used. Other "blowins", however, may occur in a more central portion of the sheet, thereby spoiling the sheet for use as window glass and the like. This is particularly true when employing sheeting containing the inevitable residual volatile solvent present in sheeting produced by processes employing volatile solvents.

We have found that the primary causes of such "blowins" is the presence of residual strain in the thermosplastic lamination, and, also in certain types of sheets, the presence of distortion producing substances such as residual solvents. When the assembly is heated during the pressing operation these strains are released, occasioning a shrinkage of the thermosplastic layer, and the residual solvent, if present, is volatilized causing internal expansion and distortion of the sheet.

We have also found that the residual strains in the sheet are due chiefly to strains set up in the hot thermoplastic sheet when it is pulled away from the extrusion die under a stretching tension and cooled during the sheet-forming process under this tension. Thus, on reheating in the autoclave, the thermoplastic sheet alters its condition and tends to release the tension, or in other words, produces shrinkage.

In the case of a sheet made from a composition which initially contained a substantial amount of low boiling solvents, experience has shown that the sheet itself will contain a substantial residual amount of solvent even though the sheet is cured in an effort to remove excess solvent. In the heating and pressing processes during the manufacture of laminated glass, this residual solvent tends to vaporize, sometimes under considerable pressure and produce the "blowins" at various areas of the plastic sheet. If the sheet has been stretched during manufacture, these forces caused by the vaporized solvent also tend to aid in releasing the residual forces introduced in the sheet by such stretching. The presence of residual solvent in a lamination, even if below a point to cause difficulty during manufacture is undesirable, since it may produce "blushing" and other undesirable effects on ageing, particularly if employed in exposed places, such as in automobile window glass, where in many cases it is subjected to wide temperature variations.

An object, therefore, of our invention is a substantially uniform and low-shrinking, solvent-free sheet, which is adaptable for use in making laminated glass.

Another object of the invention is a method and apparatus for producing a thermoplastic, substantially uniform and low-shrinking sheet of a uniform density.

A still further object is a method of forming thermoplastic sheets having a minimum of strains.

Another object is a method and apparatus for regulating the tackiness of the extruded sheeting prior to finishing. Other objects will appear hereinafter.

In accordance with one feature of the present invention these and other objects are attained by feeding a substantially constant amount of a suitable thermoplastic material to our improved extrusion die by forcing weighed amounts of the composition from the pressure chamber of a power injection press to a plurality of conveyor screws which are connected with the die chamber. In passing through the first screw conveyor the material may be cooled to prevent interference with the operation of the injection press and it may be heated when passing through the remaining conveyors.

In accordance with another feature of the invention the plastic composition is forced at a constant rate through a heated die having an internally heated core centrally supported in the die chamber. Immediately before the die orifice a hollow chamber is formed in the core in which the on-flowing plastic is again thoroughly commingled.

Another feature of the invention comprises supporting the extruded article without strain, immediately before and after it is slit, out of contact with mechanical supporting members by subjecting it to regulated fluid pressures. A related feature is the prevention of the condensation of fumes of plasticizer or other material on the extrusion parts, and the formation of droplets which drop on the extruded tube or sheet.

In accordance with another feature of the invention the slit tube may be opened by a fluid pressure spreading device. A further feature of the invention includes drawing the sheet from the extrusion die through a heating chamber at a rate substantially equal to the rate at which the plastic is forced out of the die.

Only by the combination and cooperation of the salient features above mentioned, may a sheet having the properties hereinafter defined, be produced.

The invention will be more clearly understood from the following detailed description with reference to the attached drawings in which:

Figs. 1 and 1a is a diagrammatic view in elevation of our improved apparatus for the production of thermoplastic sheeting.

In these drawings like elements are designated with the same numeral, for convenience in description.

Figure 2:
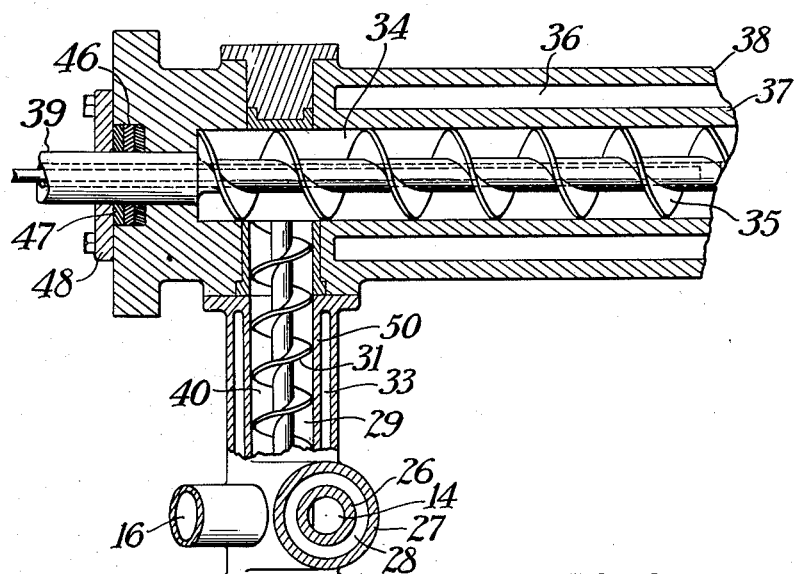
Fig. 2 is an enlarged plan view of a portion of the automatic feeding mechanism shown in Fig. 1 whereby the details of the coaction of the two feed screws may be more clearly understood.

Referring to Fig. 1 there is shown an extrusion apparatus for the continuous production of thermoplastic sheeting comprising a hopper 1 in which the thermoplastic material for making the sheeting is placed as indicated at 2. A suitably plasticized cellulose organic derivative composition, devoid of volatile solvent, such as described in Blackard and Waterman application Ser. No. 127,660 of even date may be employed in making our sheeting. A suitable revolving mechanism 3 rotated by means of a gear 4 held in a supporting member 5 serves to conduct a stream of the material from feed hopper 1 through funnel 6 to auxiliary hopper 7. The material is then permitted to flow into the vibrating pan 8 of the automatic weigher 9. Pan 8 is supported on flexible members 11 which are attached to a vibrating mechanism 12. The material is thus shaken out of pan 8 into pan 13 of automatic weigher 9. When a predetermined weight of material accumulates in the pan it drops into the pressure chamber 14 of the hydraulic press 15 through the passageway 16.

The hydraulic press 15 comprises a plunger 17 mounted upon and moved by a cross head 18 which in turn is reciprocated by a piston rod 19 and piston 21 reciprocable in hydraulic cylinder 22 mounted on the supporting member 23. The cylinder 22 is supplied with air under pressure through pipes 24 and 25, the flow of air being regulated by appropriate valve mechanisms, not shown, designed to exhaust or open one of the pipes when supplying the other pipe with high pressure fluid. By movement of the valve in one direction the plunger 17 may be forced into the chamber 14, while the movement of the valve in the opposite direction will cause retraction of the plunger from the chamber. The chamber 14 has double walls 26 and 27 which form a jacket 28 through which cooling liquids may be passed to prevent softening and gumming of the mixture in the vicinity of the plunger 17. When the chamber 14 is filled with the thermoplastic composition, the press 15 is actuated and the composition is forced by plunger 17 into a jacketed chamber 29. A pressure of 600–700 pounds per sq. in., preferably 670 pounds, upon plunger 17 is suitable for a composition of the type mentioned and a machine of the type described.

This chamber 29 shown in detail in Fig. 2 contains a close fitting conveyor screw 31 whose shaft 32 is also shown in Fig. 1, and has a cooling jacket 33 formed by double walls 40 and 50 through which water or other cooling fluid may be passed. Cooling jackets 28 and 33 interconnected and the cooling fluid may be conducted thereto and removed therefrom by suitable inlets and outlets not shown in the drawings. If desired the conveyor screw 31 may be internally cooled by employing a screw having a hollow interior with suitable means for conveying cooling fluid to and from the interior. The screw 31 may be rotated by any suitable motive means attached to its shaft 32 which is suitably journaled in a stuffing box the head of which is shown at 41 in Fig. 2.

The material is carried along by the conveyor screw 31 through the cooled chamber 29 and into the adjacent heat jacketed chamber 34. This chamber 34, as shown in Figs. 1 and 2, contains a conveyor screw 35 and has a heating jacket 36 formed between the double walls 37 and 38. This conveyor screw 35, if desired, may also be made with a hollow shaft so that a heating medium may be conducted therein to further heat the material in the chamber 34. The shaft 39 of screw 35 is journaled in a stuffing box 42 and is rotated by gears 43 and 44, the latter of which is mounted on shaft 45 which may be rotated by any suitable source of power applied thereto. The conveying mechanisms are mounted on suitable supports 75 and 76. The construction of the stuffing box 42 is shown in more detail in Fig. 2 and comprises a hollow chamber 46 containing packing material 47, and closed by plate 48.

The material is thoroughly heated and kneaded in chamber 34 as it is carried along by the screw until it becomes a plastic mass. The screw 35, as shown in Fig. 1, conducts this plastic mass out of chamber 34 and into the extrusion die chamber 55 where it is further heated.

Figure 3:
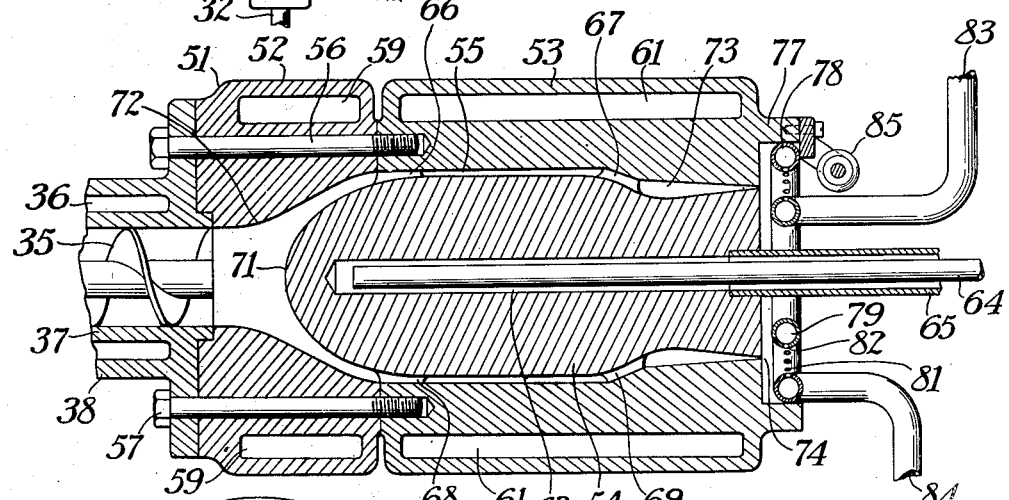
Fig. 3 is an enlarged section of the extrusion die showing details of the core and chamber and the means for supporting the sheet and preventing condensation of any plasticizer fumes.

As shown in Fig. 1 and in enlarged detail in Fig. 3 the extrusion die assembly 51 comprises two hollow members 52 and 53 and a core member 54 positioned in the hollow chamber 55. The members 52 and 53 are fastened together by suitable bolts 56 and 57 and member 52 is in close contact with the conveyor screw chamber 34 being bolted also by the bolts 56 and 57 to the flange 58 of the conveyor screw chamber. Members 52 and 53 have heating jackets 59 and 61 through which suitable heating fluid may be passed, the conducting pipes not being shown.

The core 54 has a hollow center 63 which serves as an internal heating chamber into which a heating fluid may be conducted through inflow pipe 64 and removed by outflow pipe 65. The core 54 is of smaller diameter than the chamber formed by members 52 and 53 so that there is a clearance therebetween. The core 54 is centered on a plurality of supporting arms some of which are shown at 66, 67, 68 and 69 and which are spaced to permit the material to flow between them. Preferably as indicated in the drawings, they are of a stream line contour so that the plastic mass, although divided by them, tends to flow together again without having open spaces in the onflowing mass which may interfere with the production of a uniform sheet.

The head 71 of the core 45 is of a blunt shape and the adjacent wall 72 of the chamber is conical in shape so that the plastic material being forced into the chamber is more or less uniformly divided around the core head 71 and a uniform cylinder of plastic material is caused to begin to flow along through the heating chamber 55. To further insure a uniform and compact mass after the plastic is divided by the stream lined arms 66, 67, 68 and 69 before the plastic mass is extruded from the die, a hollow circular cavity 73 is formed in the core 54 near the output end. It is to be noted that in our device, the cavity is grooved in the core. This has several advantages as will be apparent hereinafter. This causes a final commingling of the plastic as it is forced along against the convergence of the die orifice 74.

The chambers 34 and 55 are maintained at a temperature of approximately 100° to 170° C., preferably 145° C., so as to colloidize the plastic composition passing therethru. This temperature may vary somewhat depending upon the plastic material, as more fully described in Kimble and Blackard application Ser. No. 127,661 of even date. Obviously, the plastic should not be heated to a point which would cause any decomposition thereof.

Figure 4:
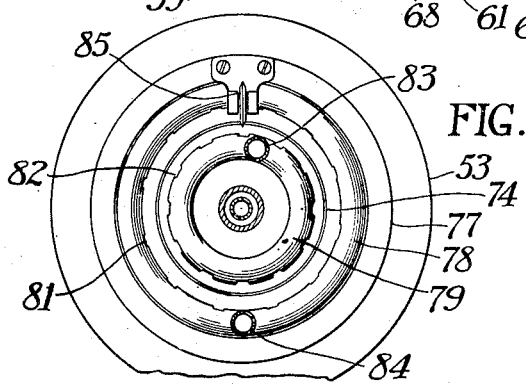
Fig. 4 is an end view in elevation of the extrusion die showing the position of the fluid jets in respect to the extruded sheet.

As shown in Fig. 1 and more clearly in the end elevational view in Fig. 4 the end of the extrusion die assembly 51 is extended at 77 and a pair of concentric gas jets 78 and 79 are mounted thereon, above and below the opening of the die.

The gas jets may be annular pipes having a plurality of holes 81 and 82 appropriately positioned therein so that the outflowing fluid will impinge on the extruded tube. Conduit pipes 83 and 84 connected to a suitable source of gas, not shown, supply gas to the respective jets under pressure. The gas released by these pipes may of course be the same or different gases, and may be at the same or different temperatures. In general they serve to furnish a fluid support and a heating medium for carrying away substances which tend to condense on the apparatus adjacent to the die opening. The support and temperature action of the fluid on the extruded sheet prevent the introducing of strains and give a temperature gradient which prevents too sudden cooling of the sheet, all as more fully described in Blackard application Ser. No. 127,662 of even date.

A slitting mechanism comprising a revolving circular knife 85 is positioned adjacent and above the die orifice 74. An additional annular gas jet 86 is placed in spaced relationship to the knife 85 and the pair of concentric jets 78 and 79 are in a plane therewith so that as the slit tube is carried along the gas impinging on its interior will tend to flatten it out. The gas may be conducted thereto through conduit 87.

If desired to further support the plastic sheet, another and larger annular ring may be placed outside the plastic sheet with jets pointing inwardly, the ring preferably being concentric with the ring 86. Also further sets of gas rings may be spaced between rings 79 and 86 or beyond ring 86. Or further gas rings on the otuside of the sheet along (like ring 78) may be spaced along the sheet to give it further fluid support from the outside or underside of the sheet, such rings being shaped to conform approximately to the shape of the sheet at that point. The plasticizer fumes which are dissipated by the gas from the rings 79, 78, 86 and the like may, of course be collected by providing a suitable hood, which has a slight suction therein to pull away the fumes.

The gas used should, preferably, be inert toward the sheeting and may be air, nitrogen or other such gas. The temperature of the gas is preferably the same as the temperature at which the chambers 34 and 55 are maintained.

Referring again to Fig. 1 the extruded sheet 88 after passing the gas jet is conducted over a pair of conical rolls one of which is shown at 89, over a guide roll 91 and over driven roll 92 and between rolls 92 and 93 and over roll 93 to a heating chamber 94.

As shown in Fig. 1 the heating chamber 94 comprises an upper platen 95 and a lower platen 96 one or both of which may be heated in a conventional manner for example by steam coils shown at 97 in the lower platen. An endless conveyor belt 98 revolving on drums 99 and 100 one or both of which may be driven if desired by a suitable source of power, not shown, passes through this heating chamber 94 for supporting and conveying the extruded sheet 88 therethrough. A container 101 may be placed around the belt 98 to prevent it from rapidly cooling.

Adjacent the heating chamber 94 is a conical guide roll 102 and a plurality of calender devices 103, 104, 105 comprising mounting members 106, 107 and 108 and pairs of calender rolls 109, 110, 111, 112, 113 and 114. These rolls are capable of being adjusted to exert different pressures on materials passing therethrough. Ahead of the last two calender devices are heating chambers 115 and 116 which may be of conventional design having upper and lower heated platens similar to those described in connection with heating chamber 94. If desired these heating chambers may also have an endless conveying belt of the type employed in heating chamber 94.

The ovens 94, 115 and 116 are preferably maintained at approximately 90° to 150° C., preferably about 132° C., and the calender rolls at 30° to 80° C., preferably 50° C., as more fully described in Kimble and McLellan application Ser. No. 127,663 of even date.

Following the last series of calendering rolls is a conical guide roll 120 and a plurality of larger hollow cooling drums 121 and 122. These drums are positioned in spaced relationship to exhibit the greatest surface of the sheeting passing thereover to cooling effects. The temperature of these rolls may be regulated by suitable cooling fluids which may be introduced into the hollow drums and conducted therefrom in any satisfactory manner. Following the cooling drums, a pair of conical rolls one of which is shown at 119 conduct the sheet to edge trimming devices 123 and 124; and a conical guide roll 125 and a spool 126 may be interposed in series with a wind up roll 127 which is mounted on a support 128. It will be understood that suitable motive power is supplied to the conveyor screws, the calender rolls, the driving rolls and other parts of the apparatus which are positively driven, by any satisfactory manner known to the art.

While it will be understood that any solvent free thermoplastic composition suitable for making a thermoplastic sheet may be employed, we prefer to employ compositions made in accordance with the method described and claimed in the copending application of E. C. Blackard and J. H. Waterman, Serial No. 127,660 entitled "Method of plasticizing thermoplastic materials," or compositions made by the method described and claimed in S. E. Palmer's copending application, Serial No. 70,201, filed March 23, 1936 and entitled, "Plasticizing method" now Patent 2,150,939.

Such compositions may be of any suitable cellulose organic derivative, such as cellulose acetate, cellulose propionate, cellulose butyrate, cellulose acetate propionate or other cellulose organic acid esters, or of the cellulose esters such as ethyl cellulose, benzyl cellulose and the like. Suitable plasticizers, preferably the so-called active or solvent plasticizers, may be employed with the above mentioned cellulose derivative base materials, such as dimethyl phthalate, diethyl phthalate, benzyl lactate, triacetin, ethylene glycol diacetate, diethylene glycol diacetate, triethylene glycol diacetate, ethylene glycol dipropionate, glyceryl chloro diacetate or suitable mixtures thereof.

This material which, is in the form of a plasticized powder, is now introduced into hopper 1 of the sheet making apparatus shown in Fig. 1. From this hopper it flows onto a revolving disk 3 and is uniformly delivered to a funnel 6 and to an auxiliary hopper 7 from whence it flows into vibrating pan 8 of the automatic weighing mechanism 9, and is jarred out into the scale pan 13. When a predetermined amount of material fills the pan 13 it automatically empties into chute 16 and fills the pressure chamber 14 of the injection press 15. This injection press may be actuated by any suitable timing mechanism in synchronism with the automatic weigher so that a weighed charge is ready to fill the pressure chamber when the piston is raised. The weighing and feeding mechanisms are adjusted in accordance with the rate of extrusion and the size of the extruded sheeting. While for the continuous production of sheeting we prefer to employ an automatic feeding system such as described. It will be understood that other automatic systems may be employed or the process may be run by manual feeding.

The injection cylinder forces the charge from chamber 14 into the screw conveyor chamber 29 where it is cooled by the fluid in the cooling jacket 33 and carried along by screw 31 to screw conveyor chamber 34. This chamber is heated to approximately 145° C. by suitable fluids flowing through heating jacket 36 and the mixture now becomes colloidized due to the combination of the plasticizer and cellulose acetate. The temperature and kneading is sufficient to bring the colloidized composition to a plastic condition. The conveyor screw 35 carries the plastic mass along to the extrusion die chamber 55. It will be understood that the injection press is forcing a constant amount of material at regular intervals into the screw conveyors so that a uniform flow through the conveyors of a closely packed coherent material is maintained. The head of the core 71 cooperating with the adjacent complementary wall 72 of the chamber uniformly divides the onflowing plastic and distributes it evenly between the chamber wall and the core. The plastic is kept at a desired temperature approximately 145° C. by heat from the internally heated core and the externally jacketed chamber. The plastic now flows through the die chamber in the form of a hollow cylinder, being divided temporarily by the plurality of stream line supports some of which are shown at 66, 67, 68 and 69. While, as pointed out above, due to the stream lining of these supports the plastic tends to flow together and not leave openings in the onflowing hollow cylinder, a hollow annular cavity 73 is made in the core to further assure complete coherence of the plastic before it is extruded. The plastic cylinder, therefore, after passing the last supports 68 and 69, enters the cavity 73 where owing to the back pressure against the narrowed die orifice 74 it becomes thoroughly commingled and forms a coherent mass. Thus up to this point a constant and uniform mass of plastic has been forced steadily along by the cooperation of the automatic weighing and force feeding devices to the die orifice 74 and therefore an exceptionally uniform tube may be continuously extruded therethrough.

We have found that although this pressure feeding extrusion apparatus will extrude an exceptionally uniform tube, the tube is easily deformed immediately after its passage out of the die by too sudden cooling, by elongation caused by tension and faulty supporting, and by undesirable mechanical processes for changing the tube into a sheet, as well as by dropping of condensed plasticizer fumes thereon.

We have substantially eliminated such undesirable variables by our novel method of extruding and slitting and spreading the tube into a sheet while initially supporting it on a fluid support.

The extruded tube on passing through die opening 74 passes between the adjacent concentric fluid jets 78 and 79. Air, or other suitable gas, flowing through these jets under pressure impinges on either side of the tube at a constant pressure and thus tends to prevent the immediate sagging of the tube. This air is also at a sufficient temperature to prevent condensation and to carry away any of the plasticizer fumes which rise from the extruded tube. We have found that a source of weak spots in such sheeting is quite often caused by the condensation of plasticizer fumes, from the sheet, onto the adjacent metallic parts of the extrusion apparatus. There the condensed fumes form droplets which drop onto the sheet from time to time and tend to produce colloidized spots or sections having different physical characteristics than the remaining portions. In fact, in some cases actual holes in the warm sheeting are produced which subsequent calendering will not iron out.

While the prevention of condensation of any plasticizer fumes which may occur in the vicinity of the extrusion orifice is extremely important, we do not wish to give the impression that any extensive loss of plasticizer from the sheeting occurs. While water is known to boil at 100° C., it is likewise equally well known that water evaporates slowly at lesser temperatures. Similarly, while the plasticized composition is never heated (in our process) to the boiling point of the plasticizer, none the less, as the sheet leaves the extrusion orifice it is hot enough that a small fraction of the plasticizer fumes away from the sheet. Obviously, after the process is run for several minutes these fumes will condense into droplets, which, as they grow big enough, will drop onto the sheet with consequent damage. By preventing this condensation we prevent consequent damage to the sheeting from droplets falling thereon. The plasticizer is properly termed non-volatile, because at atmospheric temperatures its volatility is inappreciable.

As the tube is extruded it is slit by revolving knife 85 and is spread open by the annular fluid jet 86 through which heated air under a suitable pressure is passed.

The sheet 88 is then supported by a pair of conical rolls 89 and passes around guide rolls 91 and 92 between rolls 92 and 93 and over roll 93 to the endless conveyor belt 98 of the heating chamber 94. This chamber which is approximately 7 feet in length is heated preferably to a temperature within the range of 90° to 150° C., preferably about 132° C. and the sheet is conducted therethru at a rate so that a given portion of the sheet is in the oven for about 80 seconds.

Care is taken that the driven rolls 92 and 93 and the conveyor belt operate in synchronism at substantially the rate at which the plastic is extruded through the die orifice. In other words substantially no positive stretch is imparted to the sheet by the conveying apparatus and die also to the air supporting and spreading features, stretching or straining of the sheet is reduced to a minimum. If desired in order to further reduce the possibility of tension on the extruded tube and sheet the apparatus may be elevated or in fact the tube may be extruded vertically, either up or down, instead of in a horizontal direction.

The sheet in passing through the heating chamber on the conveyor belt is supported without tension being exerted thereon and is heated at a sufficient temperature to release any strains which may have been set up in the sheet after extrusion. It now passes between calendering rolls 109 and 110 of the calender 103 where it is reduced slightly in thickness. On leaving calender 103 the temperature of the sheet is raised again by passing it through heating chamber 115 to prepare it for a further calendering. The sheet then is further calendered in calender 104 between rolls 111 and 112 and again is passed through a heating chamber 116, to increase its temperature so that it can be further calendered. The sheet is finally calendered in calender 105 between rolls 113 and 114. The calender rolls are preferably maintained at a temperature of approximately 30° to 80° C., preferably 50° C., and the heating chambers are heated to about 90° to 150° C., preferably about 132° C. The calendering operations not only gradually reduce the sheet to a desired thickness but also roll the sheet sufficiently to produce a smooth uniform surface thereon.

From the last calender rolls the sheet passes over conical guide rolls 120 and over cooling rolls 121 and 122. The cooling rolls reduce the tackiness of the sheet sufficiently to prevent it from sticking when rolled up on a spool. The sheet is conducted over another pair of conical guide rolls 119 and through a suitable edge trimming device having a plurality of circular cutting knives, as shown at 123 and 124. The sheet then is guided over conical guide rolls 125 and wound up on spool 126 which is mounted on a suitable shaft 128 and support 129. This spool may be turned by any suitable mechanism. However, no positive stretch is exerted on the sheet, only sufficient pull being used to wind up the sheet.

Our invention of course is not limited to the production of a sheet of any particular dimension, however, we have found that a die having an orifice which extrudes a sheet approximately .027 to .030 inch in thickness and 31 inches wide is very satisfactory for the production of laminated glass sheeting. For a sheet of these dimensions, the first pair of calender rolls are set at about .027 inch apart, the second pair at .026 inch apart and the third pair at .024 inch apart. This will produce a sheet approximately .024 inch in thickness.

By employing our novel apparatus and process solvent free thermoplastic sheeting particularly suitable for use in making laminated glass can be made which is of uniform dimensions and density and contains substantially no strains and contains no low boiling solvents which might tend to cause "blowins" when pressed and heated between glass laminations. Furthermore, since there are no low boiling solvents present, the sheet can be used immediately after its production, since no curing or seasoning of it is necessary. We have found that our sheeting has a shrinkage well below 25% lengthwise which is well below the upper tolerance beyond which "blowins" occur. This figure is based on the results of tests made on a number of different thermoplastic sheets from which a sample of sheeting 1" x 6" is accurately cut. It is placed on a sheet of cardboard and put in an oven at 265° F. for one minute, and is then cooled and measured for change of dimensions. We have, for instance, been able to produce sheeting having a lengthwise shrinkage of as low as approximately 15%. Hence our preferred shrinkage lies between about 15% to about 25%. In addition our sheeting is exceptionally free from haze, or other defects which might impede the transparency and clarity of the finished sheet. It is also of very uniform density, tensile strength, flexibility, and other physical properties. Likewise since no volatile solvents are employed in the composition extruded, the sheets require no curing for removal of solvent and the sheets may, therefore, be immediately used or safely stored for future use. In fact, the process as a whole is characterized by its extreme simplicity of operation.

While we prefer to employ the process as described above in order to produce a superior thermoplastic sheeting it will be understood that a sheeting of less superior characteristics can be made by altering the treatment of the sheet in one or more of the steps of the process from the proposed treatment. Thus, if desired, the feeding may be modified so that we do not force the composition through the die at such a constant density and rate; or the driving rollers may be rotated at a different rate than the extrusion rate and any imperfections introduced thereby may be alleviated by our improved calendering operation.

It is an interesting observation in connection with our sheeting that during processing and even when wound up, it may—in the thickness and with the components herein described—assume a somewhat cloudy or milky appearance (not unlike mildly frosted or ground glass). However, when the sheeting is laminated with glass (involving as it does, colloidization of the plastic under heat and pressure) or otherwise colloidized, a product of high clarity results.

While in the above example for the treatment of a thin plasticized cellulose acetate sheet it is preferred to employ a heating chamber approximately seven feet long it will be understood for the treatment of sheets of different cellulose derivative plastic material and/or dimensions that longer or shorter heating chambers may be employed with suitable variations in speed of conducting the sheeting through the oven and temperature of heating. In some instances the degree of treatment in the last two heating chambers for the purpose of softening the sheeting may be of less magnitude than in the first heating chamber and this can be accomplished by reducing the length of these heating chambers.

What is claimed is:

1. The process of forming an improved uniform and low shrinking thermoplastic sheet which comprises forcing a suitable organic thermoplastic material thru an extrusion die at a constant rate and pressure, supporting the sheet at a point in the vicinity of the die by gaseous supporting means, conveying the sheet thru heating means while supporting and conveying it in a manner and at a rate less than that which is sufficient to impose any substantial tension upon the sheet, whereby residual strains are substantially removed.

2. The process of forming an improved volatile solvent-free sheet which comprises forcing a volatile solvent-free cellulose organic derivative plastic material thru an annular extrusion die at a constant rate and pressure, supporting the extruded tube by gaseous supporting means, slitting the extruded tube, spreading the slit tube by gaseous means into a sheet, alternately heating and calendering said sheet while supporting and conveying it in a manner and at a rate less than that which is sufficient to impose any substantial tension upon the sheet, whereby residual strains are substantially removed and cooling the sheet.

3. The process of forming a volatile solvent-free thermoplastic sheet which comprises forcing a volatile solvent-free cellulose organic derivative plastic material containing a solvent plasticizer through an annular extrusion die at a constant rate and pressure, supporting the extruded tube by gaseous supporting means, said means being also adapted to prevent condensation of plasticizer in the vicinity of the die, slitting the extruded tube, spreading the slit tube by additional gaseous means into a sheet, alternately heating and calendering said sheet while supporting and conveying it in a manner and at a rate less than that which is sufficient to impose any substantial tension upon the sheet, whereby residual strains are substantially removed, and cooling the sheet.

4. The process of forming a volatile solvent-free thermoplastic sheet which comprises forcing weighed amounts of volatile solvent-free cellulose organic derivative plastic material thru a tubular extrusion die at a constant rate and pressure, supporting the extruded tube by gaseous supporting means, conducting the tube away from the die at a rate substantially equal to the extrusion rate, slitting the extruded tube, spreading the slit tube by gaseous means into a sheet, alternately heating and calendering said sheet while supporting and conveying it in a manner and at a rate less than that which is sufficient to impose any substantial tension upon the sheet, whereby residual strains are substantially removed, and cooling the sheet.

5. In apparatus for the production of thermoplastic sheeting, an extrusion die, means for forcing a constant amount of organic thermoplastic material thru the die to form a sheet, gaseous means for supporting the extruded sheet and for preventing condensation of fumes on the apparatus, means for conducting the sheet from the die without exerting substantial tension thereon, means for alternately heating the sheet while under substantially no tension and means for calendering the sheet intermediate said heating.

6. In apparatus for the production of thermoplastic sheeting, an extrusion die, means for forcing a constant amount of organic thermoplastic material thru the die to form the sheet, gaseous means for supporting the extruded article and for preventing the condensation of volatile materials thereon, means for conducting the sheet from the die without exerting substantial tension thereon, means comprising a heating chamber with an endless conveyor belt therein for supporting and conveying the sheet therethru without exerting tension thereon, means for calendering the sheet positioned immediately after said heating chamber and additional heating and calendering means for alternately heating and calendering the sheet and means for cooling the sheet without exerting substantial tension thereon.

7. A low boiling volatile solvent-free sheet of a cellulose organic derivative of uniform density and dimensions, said sheet having the general characteristics of one produced by forcing a suitable cellulose organic derivative thermoplastic material through an extrusion die at a constant rate and pressure, supporting the sheet at a point in the vicinity of the die by gaseous supporting means, and conveying the sheet through heating means while supporting and conveying it in a manner and at a rate less than that which is sufficient to impose any substantial tension upon the sheet.

8. As a new product, a low boiling volatile solvent-free sheet of a cellulose organic derivative of uniform density and dimension, which sheet, when a 1" by 6" sample thereof is heated in an oven at approximately 265° F. for approximately one minute, has a shrinkage coefficient in the range of approximately 15 to 25 per cent, which material has been produced by forcing a low boiling volatile solvent-free cellulose organic derivative thermoplastic composition thru an extrusion die and supporting the sheet at a point in the vicinity of the die by gaseous supporting means, and conveying the sheet through heating means while supporting and conveying it in a manner and at a rate less than that which is sufficient to impose any substantial tension upon the sheet.

JOHN S. KIMBLE.
ERNEST C. BLACKARD.
JOHN S. McLELLAN.